(12) United States Patent
Georgeson et al.

(10) Patent No.: US 10,307,977 B2
(45) Date of Patent: Jun. 4, 2019

(54) VERIFIABLE QUICK PATCH REPAIR FOR COMPOSITE STRUCTURES

(71) Applicant: The Boeing Company, Chicago, IL (US)

(72) Inventors: Gary E. Georgeson, Tacoma, WA (US); Kenneth H. Griess, Kent, WA (US)

(73) Assignee: The Boeing Company, Chicago, IL (US)

( * ) Notice: Subject to any disclaimer, the term of this patent is extended or adjusted under 35 U.S.C. 154(b) by 504 days.

(21) Appl. No.: 15/059,321

(22) Filed: Mar. 3, 2016

(65) Prior Publication Data

US 2016/0176177 A1    Jun. 23, 2016

Related U.S. Application Data

(62) Division of application No. 14/181,962, filed on Feb. 17, 2014, now Pat. No. 9,539,798.

(51) Int. Cl.
*B29C 65/00* (2006.01)
*B29C 65/02* (2006.01)
(Continued)

(52) U.S. Cl.
CPC .............. *B29C 73/14* (2013.01); *B32B 3/266* (2013.01); *B32B 7/12* (2013.01); *B32B 27/08* (2013.01);
(Continued)

(58) Field of Classification Search
CPC ......... B29C 73/04; B29C 73/06; B29C 73/08; B29C 73/10; B29C 73/105; B29C 73/12; B29C 73/14; B29C 65/48; B29C 65/483; B29C 65/488; B29C 65/562; B29C 65/565; B29C 65/72; B29C 65/82; B29C 66/304;
(Continued)

(56) References Cited

U.S. PATENT DOCUMENTS 3,661,683 A  *  5/1972  Engel ...................... B29C 73/00
                                                        100/211
3,855,881 A    12/1974  Buckland
(Continued)

FOREIGN PATENT DOCUMENTS

GB               571598 A  *  8/1945  ............ B29C 73/30

*Primary Examiner* — Philip C Tucker
*Assistant Examiner* — Brian R Slawski
(74) *Attorney, Agent, or Firm* — Ostrager Chong Flaherty & Broitman P.C.

(57) ABSTRACT

A method for patching a hole in a composite parent structure. The method comprises: inserting an insert in the hole; placing a composite patch having a multiplicity of curved flexible members on one side of the composite parent structure in a position where a central portion of the composite patch overlies the insert and the flexible members confront opposing portions of the composite parent structure providing adhesive between the composite patch, the insert, and the composite parent structure; pressing the composite patch against the composite parent structure with sufficient pressure to force the flexible members to conform to the shape of the composite parent structure; and while the flexible members are in a stressed state, curing the adhesive in a manner that causes the flexible members to bond to the parent structure.

23 Claims, 9 Drawing Sheets

(51) Int. Cl.

| | |
|---|---|
| *B32B 37/00* | (2006.01) |
| *B32B 38/00* | (2006.01) |
| *B32B 7/08* | (2019.01) |
| *B29C 73/00* | (2006.01) |
| *B32B 43/00* | (2006.01) |
| *B29D 7/00* | (2006.01) |
| *B32B 38/18* | (2006.01) |
| *B32B 3/26* | (2006.01) |
| *B23P 6/00* | (2006.01) |
| *B29C 73/14* | (2006.01) |
| *B32B 7/12* | (2006.01) |
| *B32B 37/10* | (2006.01) |
| *B32B 37/12* | (2006.01) |
| *B32B 27/08* | (2006.01) |
| *B29K 105/08* | (2006.01) |
| *B29K 105/00* | (2006.01) |
| *B29L 31/30* | (2006.01) |

(52) U.S. Cl.
CPC .......... *B32B 37/10* (2013.01); *B32B 37/1018* (2013.01); *B32B 37/12* (2013.01); *B29K 2105/08* (2013.01); *B29K 2105/256* (2013.01); *B29L 2031/3082* (2013.01); *B32B 2305/72* (2013.01); *B32B 2556/00* (2013.01); *B32B 2605/18* (2013.01); *Y10T 428/24314* (2015.01)

(58) Field of Classification Search
CPC .......... B29C 66/721; B29L 2031/3082; B32B 2605/18; B32B 2556/00; B32B 37/1009; B32B 37/1081; B32B 2305/72
USPC .. 156/60, 64, 91, 92, 94, 98, 153, 196, 212, 156/214, 272.2, 285, 286, 292; 428/63; 29/402.09, 402.11, 402.14, 402.15, 29/402.17
See application file for complete search history.

(56) References Cited

U.S. PATENT DOCUMENTS

| | | | |
|---|---|---|---|
| 3,865,662 A * | 2/1975 | Segal | B29C 65/18 138/99 |
| 4,100,712 A | 7/1978 | Hyman | |
| 4,588,626 A | 5/1986 | Cologna et al. | |
| 4,820,564 A | 4/1989 | Cologna et al. | |
| 5,034,254 A * | 7/1991 | Cologna | B29C 73/14 156/307.4 |
| 6,013,343 A | 1/2000 | Radke et al. | |
| 6,149,749 A * | 11/2000 | McBroom | B29C 73/02 156/87 |
| 6,435,242 B1 * | 8/2002 | Reis | B29C 73/12 156/382 |
| 6,656,299 B1 | 12/2003 | Grosskrueger et al. | |
| 7,398,698 B2 | 7/2008 | Griess et al. | |
| 8,568,545 B2 | 10/2013 | Lindgren et al. | |
| 2005/0205573 A1* | 9/2005 | Fleenor | B65D 90/10 220/233 |
| 2007/0100582 A1* | 5/2007 | Griess | G01M 5/0033 702/183 |
| 2014/0356057 A1 | 12/2014 | Griess et al. | |
| 2015/0001768 A1* | 1/2015 | Kia | B29C 73/30 264/484 |

* cited by examiner

VERIFIABLE QUICK PATCH REPAIR FOR COMPOSITE STRUCTURES

RELATED PATENT APPLICATION

This application is a divisional of and claims priority from U.S. patent application Ser. No. 14/181,962 filed on Feb. 17, 2014, which issued as U.S. Pat. No. 9,539,798 on Jan. 10, 2017.

BACKGROUND

This disclosure generally relates to systems and methods for repairing structures comprised of composite materials, and in particular, to methods and systems for effecting such repairs with limited resources and time.

The use of structures comprised of composite materials (such as carbon fiber/epoxy composite material) has grown in popularity, particularly in such applications as aircraft structures, where benefits include increased strength and rigidity, reduced weight and reduced parts count. When damaged, however, composite structures often undergo extensive repair work. If performed on an aircraft, the repair work may ground the aircraft, thereby adding significantly to the support costs of the aircraft. Current maintenance procedures frequently cause the damaged component to be removed and replaced. If performed on an aircraft, the repair work may need to be completed before the aircraft can resume flying.

Commercial airlines today do not have the ability to repair structural damage to an aircraft's composite structures without severely delaying or canceling the aircraft's next flight. Short domestic flights may have only 30-60 minutes of time at the gate whereas longer and international flights may have 60-90 minutes. The Commercial Airline Composite Repair Committee, an international consortium of airlines, OEMs, and suppliers, reports, however, that the average composite repair permitted in the Structural Repair Manuals takes approximately 15 hours to complete. In most cases, flight cancellations occur when a composite repair is performed at the flight line. Removing an airplane from revenue service in order to repair a damaged composite structure costs the operator the labor to repair the structure and the adjustments to its flight schedules. It may also cause passenger dissatisfaction.

Damage to composite material can be repaired using any one of a number of known methodologies. Many of these known repair techniques involve clean-up of the damaged site followed by the installation of a repair patch made of composite material. Current state-of-the-art bonded patches for composite structure are relatively complicated and time-consuming to apply. They also are not designed to have bond strength verified using non-destructive evaluation (NDE) methods. Patch repairs cannot generally be verified because of the potential of kissing bonds that hold no load but are often invisible to current NDE methods. (As used herein, the term "disbond" refers to a separation of composite material from another material to which it has been adhesively bonded. A disbond that is tight with no bond strength or weakly bonded is referred to herein as a "kissing bond".) Typically, just bond line defects or voids can be identified. Traditional composite repair patches do not have visual indication of adhesive continuity or pressure application. This drawback has severely limited the use of bonded patches on aircraft, since their performance cannot be verified in any significant way.

Composite patch repair methods that can provide visual or NDE verification of the structural integrity of the repair would be a marked improvement over the above-described repair techniques.

SUMMARY

The subject matter disclosed herein is directed to designs and methods for applying a pre-stressed patch repair to damaged composite aircraft structure. The repair patch comprises flexible members (i.e., fingers) which are curved in an unstressed state and then are pre-stressed when the patch is pressed against a parent structure being repaired. The pre-stressed flexible members aid in creating a consistent bond line even with simple forces exerted on the patch during the patch bonding operation. One benefit of this patch design is that the patch bond can be verified for the life of the repair using common NDE techniques. When part of the bond fails, that failure creates an indication of such, as it allows no kissing bonds or very weak bonds to go undetected. The patch also has a failsafe-type design that naturally limits bond failure to localized areas, e.g., by restricting an edge disbond from spreading beyond each of the flexible members. It also can be applied in a variety of ways, including without the use of a vacuum bag system. The foregoing combination of features make this repair system extremely attractive for use in the aerospace industry.

The patch design and method of installation disclosed in detail below enable a rapid and robust repair of damaged composite structure, while providing the benefits of performance improvement and NDE verifiability. If a bond failure occurs between the patch and parent structure, the pre-stress in the patch ensures that the patch will move relative to the parent structure. This movement ensures that if a kissing bond is present, current NDE methods (such as pulse-echo ultrasound, low frequency bond-testers, ultrasonic resonance, laser shearography, or thermography) will be able to detect the unbonded interface and quantify the disbond. Therefore, the patch is extremely advantageous over current bonded patches, which can have kissing bonds not detectable with current NDE methods.

The repair application methods disclosed in detail below use a physical means for flattening the non-planar repair patch onto the surface of the parent structure for bonding and to ensure that a pre-stress will be applied for enhanced bond line properties and improved inspectability. Another benefit is that squeeze-out of adhesive at the patch edge and at the multiple slit edges through the patch provides greater confidence and a visual means of assuring adhesive coverage. The flexible members of the patch allow the bond line thickness to conform to specifications and enable independent contouring of the flexible members (due to the slits between flexible members). The contoured flexible members will either improve bond line thickness control or provide visual indication of disbonding, depending on whether the contour is into or away from the bond line.

During the repair patch application, the pre-stressed flexible members will resist deformation when pushed against the surface of the parent structure surrounding the repair site. This will induce a force on the bond line of the fingers and will ensure a better bond line that will allow for a simpler method of applying force during the repair application cure process. As stated above, the pre-stressed flexible members will tend to deform to their unflexed states when kissing bonds are formed, thereby enabling NDE methods to be successful. The ability to pre-stress the repair material at the bonded surface may also contribute to the structural performance of the bonded patch.

One aspect of the subject matter disclosed in detail below is a composite patch comprising a central portion and a multiplicity of flexible members arranged in side-by-side relationship with respective slits between adjacent flexible members and extending outward from an outermost portion of the central portion, wherein the flexible members are curved and resist flexure in a direction of decreasing curvature when in an unflexed state. The flexible members are capable of changing shape from curved to flat or less curved when pressed with sufficient force against a flat surface. An innermost portion of the central portion is flat and the outermost portion of the central portion is not flat when the composite patch is in an unflexed state. The flexible members have the property that, when the flexible members are placed in contact with a planar surface, the flexible members will change shape from curved to flat if the composite patch is pressed against the planar surface with sufficient force.

Another aspect of the subject matter disclosed herein is a composite structure comprising a parent structure having a hole, an insert in the hole, and a first patch bonded by adhesive to one side of the parent structure and one side of the insert, wherein the first patch comprises a first multiplicity of pre-stressed members arranged in side-by-side relationship around a perimeter of the first patch, and wherein each of the first multiplicity of pre-stressed members is capable of returning to an unflexed curved state in the event that a strength of the bond between that pre-stressed member and an opposing portion of the parent structure becomes zero. The composite structure may further comprise a second patch bonded by adhesive to another side of the parent structure and another side of the insert, wherein the second patch has a structure and mechanical behavior similar to that of the first patch. Preferably, the composite structure further comprises adhesive disposed in slits between adjacent pre-stressed members to provide a visual indication of sufficient adhesive coverage. In one application, the composite structure is part of an aerial vehicle, e.g., a fuselage of an aircraft.

A further aspect of the disclosed subject matter is a method for patching a hole in a composite parent structure. The method comprises: inserting an insert in the hole; placing a composite patch having a multiplicity of curved flexible members on one side of the composite parent structure in a position where a central portion of the composite patch overlies the insert and the flexible members confront opposing portions of the composite parent structure disposed around the insert; providing adhesive between the composite patch and the insert, and between the composite patch and the composite parent structure; and pressing the composite patch against the composite parent structure with sufficient pressure to force the flexible members to conform to the shape of the surface of the opposing portions of the composite parent structure while the adhesive therebetween is curing. The flexible members of the composite patch are initially curved and become less curved or straight during the pressing step. The foregoing method may further comprise non-destructive evaluation of the integrity of bond lines between the flexible members of the composite patch and the opposing portions of the composite parent structure. The pressing step may, in the alternative, comprise applying pressure using mechanical force, magnetic force or vacuum pressure. The method may also further comprise placing a bladder over the composite patch, wherein the pressing step comprises applying pressure to the bladder.

Yet another aspect is a method for patching a hole in a composite parent structure, the method comprising: inserting an insert in the hole; placing a first composite patch having a multiplicity of curved flexible members on one side of the composite parent structure in a position where a central portion of the first composite patch overlies the insert and the flexible members of the first patch confront opposing portions of the composite parent structure disposed around the insert; placing a second composite patch having a multiplicity of curved flexible members on another side of the composite parent structure in a position where a central portion of the second composite patch underlies the insert and the flexible members of the second patch confront opposing portions of the composite parent structure disposed around the insert; providing adhesive between the first composite patch and the insert, between the first composite patch and the composite parent structure, between the second composite patch and the insert, between the second composite patch and the composite parent structure; and pressing the first and second composite patches toward each other with sufficient pressure to force the flexible members of both patches to conform to the shapes of confronting surfaces of the composite parent structure while the adhesive therebetween is curing.

A further aspect is a composite structure comprising a parent structure having a hole, an insert in the hole, and a first patch bonded by adhesive to one side of the parent structure and one side of the insert, wherein the first patch comprises a multiplicity of pre-stressed members arranged around a perimeter of the first patch and separated by slits, wherein the pre-stressed members have the property that at least a portion of the pre-stressed member will move in the event that a bond strength between the portion of the pre-stressed member and an opposing portion of the parent structure changes from non-zero to zero. The composite structure may further comprise a second patch bonded by adhesive to another side of the parent structure and another side of the insert, wherein the second patch has a structure and mechanical behavior similar to that of the first patch.

Other aspects of verifiable quick composite patch repair system and methods are disclosed below.

BRIEF DESCRIPTION OF THE DRAWINGS

Reference will hereinafter be made to the drawings in which similar elements in different drawings bear the same reference numerals.

DETAILED DESCRIPTION

Pre-stressed composite repair patches, repaired composite structures, and methods for repairing composite structures using pre-stressed composite patches will now be described with reference to specific embodiments. These embodiments illustrate some but not all means and methods for reducing to practice the concepts disclosed herein. The patches, patched structures and patching methods disclosed herein can be applied to any composite structure which has been damaged, and is particularly suitable for aircraft structures made of composite material.

In the implementations disclosed in detail below, a composite parent structure having a hole, an insert in the hole and a composite patch are bonded together using adhesive. The composite patch includes features that facilitate improving bond line control between the components and/or enable potential disbond locations to be easily detected along a joint created between the components. In accordance with the specific embodiments disclosed hereinafter, the patch comprises a central portion and a multiplicity of flexible members that extend outwardly from the outermost portion of the central portion. These flexible members are stressed and then bonded to the parent structure while in a stressed state. The flexible members are stressed by pressing the patch against the parent structure, thereby causing the flexible members to flex from an unstressed state to a pre-stressed state. The flexible members are bonded to the parent structure while in the pre-stressed state. In the bonded state, the pre-stress in the flexible members exerts a force tending to restore the flexed members to their unstressed (i.e., unflexed) state were the bond strength to decrease to zero.

Figure 1A:
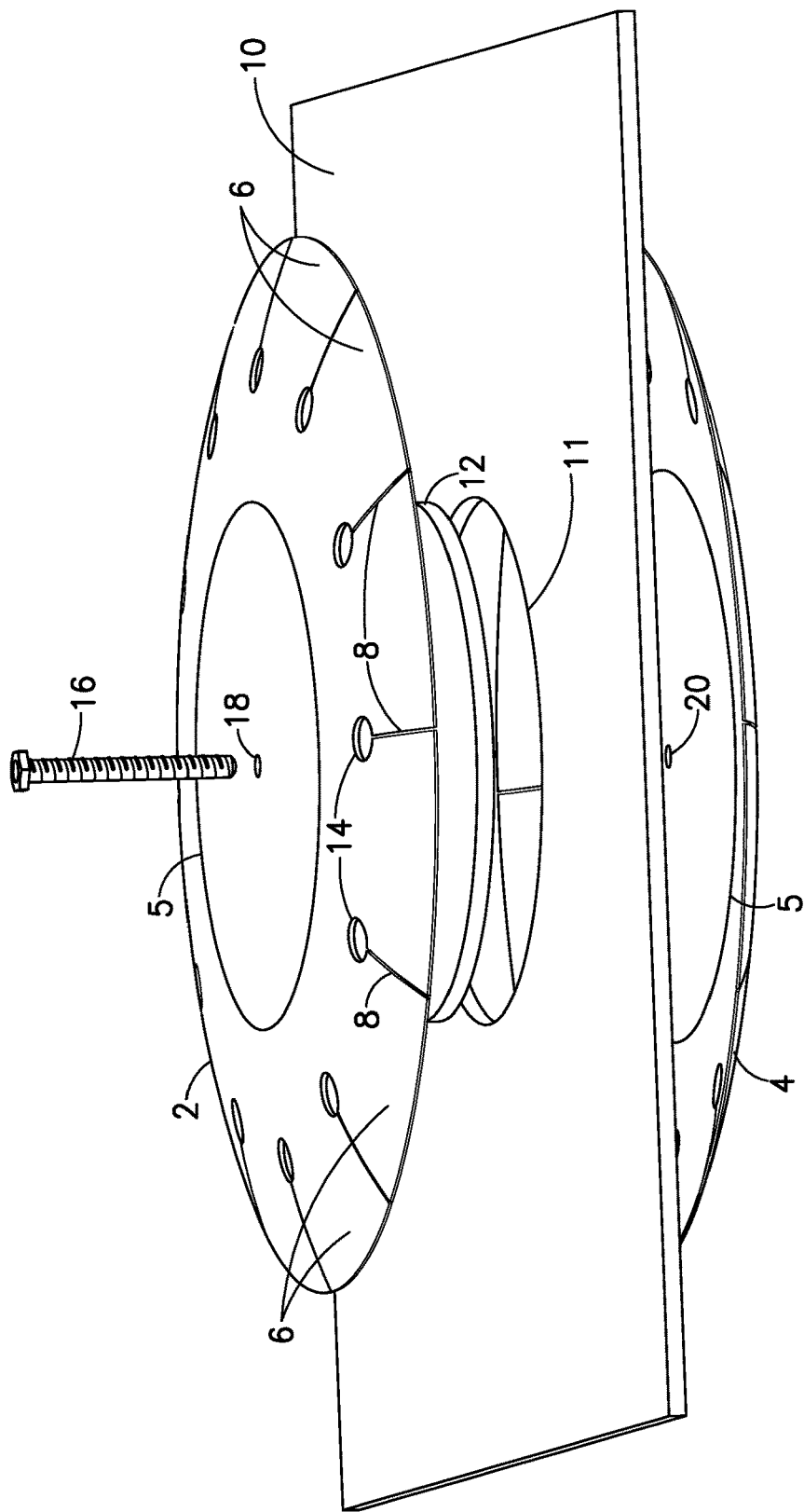
FIGS. 1A and 1B are diagrams respectively showing outer and inner exploded views of unassembled components of a verifiable composite patch repair of composite parent structure in accordance with one embodiment. (Adhesive is not shown in FIGS. 1A and 1B.)
Figure 1B:
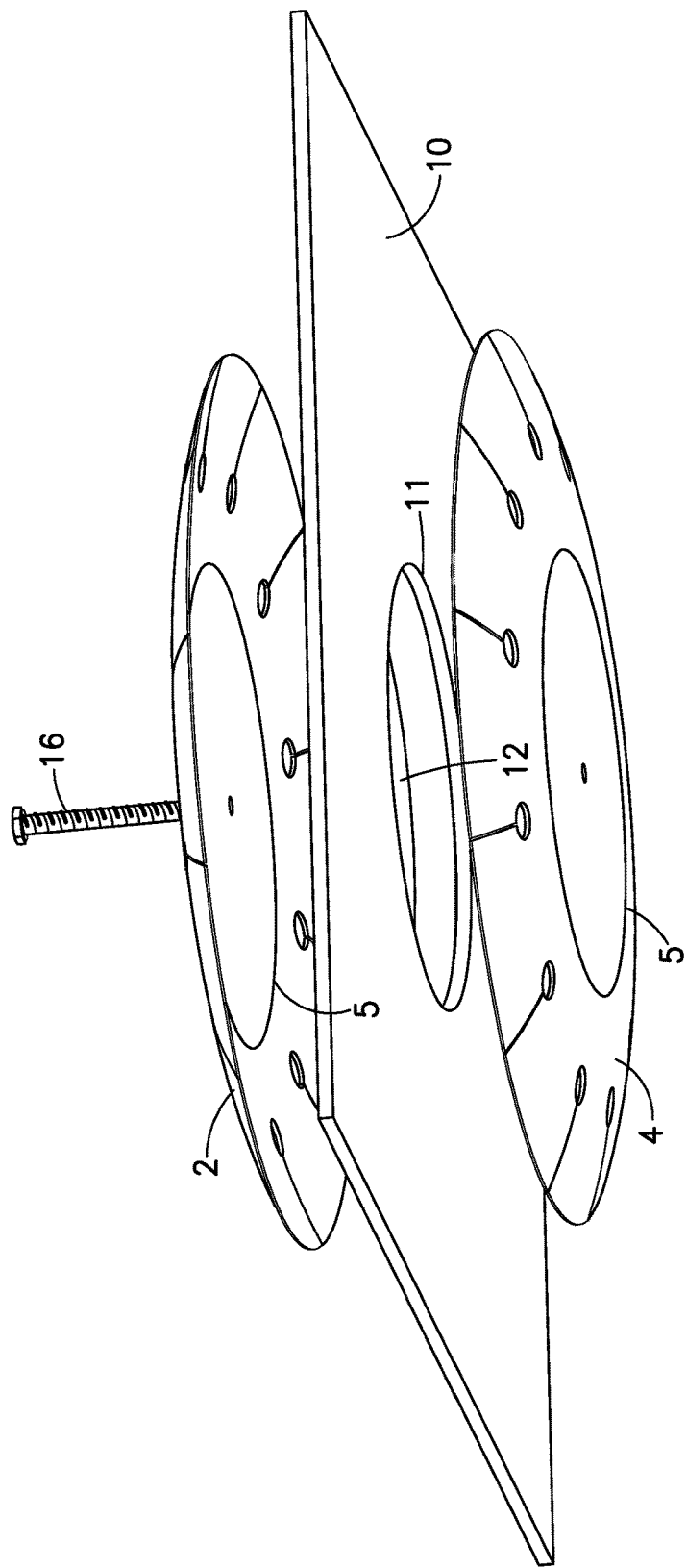

FIGS. 1A and 1B are diagrams respectively showing outer and inner exploded views of unassembled components of a verifiable patch repair of a parent structure 10 made of composite material in accordance with one embodiment. The parent structure 10 depicted in FIG. 1A has a hole 11, which may have been formed in the parent structure 10 by machining to remove remnants of a site of damage. An insert 12 made of composite material will be inserted into hole 11 during the repair process. Then a pair of patches 2 and 4, also made of composite material, are placed on opposite sides of the parent structure 10 in respective positions above and below the insert 12. The parent structure 10 may be a skin of an aircraft structure, such as a skin of a fuselage. The composite material may comprise fiber-reinforced plastic.

As best seen in FIG. 1A, patch 2 comprises a central portion have a center opening 18 and a perimeter portion having a multiplicity of stress-relief apertures 14 and a multiplicity of slits 8. The slits 8 extend from respective apertures 14 to a peripheral edge of the patch. In an initial state prior to installation as part of a repair, patch 2 has an overall shape which is not planar but, as described in more detail below, patch 2 may comprise a planar portion surrounded by a non-planar portion, which non-planar portion is capable of being flexed under pressure so that it adopts a planar configuration.

In accordance with one embodiment, the central portion of patch 2 comprises an innermost portion 5 and an outermost portion disposed between the innermost portion 5 and a hypothetical circle (not shown) which can be drawn tangent to apertures 14 to represent the outermost portion of the central portion. The inner surface of the innermost portion 5 is preferably planar in an unstressed state if the opposing surface of insert 12 is planar. In this case, the innermost portion 5 can be flat. In the alternative, if the opposing surface of insert 12 has a curved contour, then the inner surface of the innermost portion 5 (in an unstressed state) may be provided with a matching contour.

The perimeter portion of patch 2 comprises a multiplicity of curved flexible members 6 (i.e., fingers) arranged in side-by-side relationship. Adjacent flexible members 6 extend outward from the outermost portion of the central portion. A distal portion of each flexible member 6 may have a thickness which decreases gradually with increasing distance (i.e., tapers) from the center to the periphery of the patch 2. Preferably the flexible members 6 are integrally formed with the central portion of patch 2. The flexible members are separated by slits 8 and apertures 14 therebetween.

Each flexible member 6 is curved and resists flexure in an elevational direction of decreasing curvature and twisting when in the unflexed state depicted in FIG. 1A, but each flexible member 6 is sufficiently flexible that it can twist, bend and otherwise conform to the shape of an opposing surface when pressed against that surface with sufficient force. More specifically, the flexible members 6 are capable of changing shape from curved to flat or less curved when pressed against a surface. In particular, the flexible members 6 have the property that, when the flexible members 6 are placed in contact with a planar surface, the flexible members will change shape from curved to flat if the composite patch is pressed against the planar surface with sufficient force. For the purpose of illustration, it will be assumed that the surfaces of parent structure 10 are planar, in which case the innermost portion 5 of patch 2 will be flat when patch 2 is in an unflexed state. In contrast, the perimeter portion of patch 2 is curved when the composite patch is in an unflexed state and will become flat when pressed against a planar surface of the parent structure 10.

As best seen in FIG. 1B, patch 4 may have a construction similar, if not nearly identical, to patch 2. Accordingly, the foregoing description of patch 2 is equally applicable to patch 4. Although the patches 2 and 4 may be circular in shape, circularity is not required and in some applications non-circular shapes (e.g., elliptical) may be appropriate.

During the repair process, a first layer of adhesive is provided between patch 2 and parent structure 10 and between patch 2 and insert 12; and a second layer of adhesive is provided between patch 4 and parent structure 10 and between patch 4 and insert 12. This adhesive is not shown in FIGS. 1A and 1B. The adhesive is preferably applied on the inner surface of patches 2 and 4, so that when the flexible members 6 are pressed against the confronting surfaces of the parent structure 10, some of the adhesive on the inner surfaces of the flexible members 6 will be squeezed into the slits 8, providing a visual indication of adequate adhesive coverage. Preferably the adhesive has a scrim (e.g., comprising random fibers) so that all of the resin cannot be squeezed out. This features enables control of the minimum bond line thickness to conform to bond line thickness specifications.

In accordance with the embodiment depicted in FIGS. 1A and 1B, the hole 11 in the parent structure 10 is formed by machining a local area of the parent structure which has suffered damage, such as cracking or delaminations. The damaged area is removed and the resulting hole is shaped to receive an insert. In the example depicted in FIGS. 1A and 1B, hole 11 and insert 12 are both circular. After the preparation of hole 11 by machining, a repair process comprising the following steps may be performed.

First, a center opening (not shown in FIG. 1A) is formed the insert 12 and then the insert 12 is inserted in the hole 11. Optionally, adhesive is placed on either the peripheral surface of hole 11 or on the peripheral surface of the insert 12 or both before the insert 12 is inserted in hole 11. Next adhesive is applied on the inner surfaces of patches 2 and 4. Then the patches 2 and 4 are placed over and under the insert in positions such that the center opening 18 and 20 of the patches are aligned with the center opening in the insert 12. More specifically, patch 2 is placed on one side of the parent structure 10 in a position where the flat innermost portion 5 of patch 2 overlies the insert 12 and the flexible members 6 of patch 2 confront opposing portions of parent structure 10 disposed around the insert 12; and patch 4 is placed on the other side of the parent structure 10 in a position where the flat innermost portion 5 of patch 4 underlies the insert 12 and the flexible members 6 of patch 4 confront opposing portions of parent structure 10 disposed around the insert 12. A threaded rod 16 is then passed through the aligned center openings of the insert and patches. The threaded rod 16 has a length such that a portion of the threaded shaft protrudes beyond the innermost portion 5 of patch 4 when patches 2 and 4 are in unflexed states in contact with the opposing surfaces of the parent structure 10. A nut (not shown in FIG. 1A) in then screwed onto the protruding end of the shaft of threaded rod 16. The nut is then tightened until the flat innermost portions 5 of patches 2 and 4 are in contact with the insert 12. Tightening of the nut produces a mechanical force which presses the patches 2 and 4 against the parent structure 10 and causes the patches to flatten. More specifically, the head of the threaded rod 16 exerts a contact force on the portion of patch 2 that surrounds center opening 18 while the turning nut exerts an equal and opposite contact force on the portion of patch 4 that surrounds center opening 20. As part of this flattening process, the flexible members 6, which were initially curved, become flat. When the patches 2 and 4 are completely flattened, the slits 8 form gaps between the flexible members 6.

As previously mentioned, for the purpose of illustration it has been assumed that the parent structure has planar surfaces, in which case the flexible members 6 become flat. Alternatively, if a surface of the parent structure 10 is not planar, then any flexible member 6 in contact with such non-planar surface will conform to that surface. For example, the curved flexible members 6 may become less curved, but not flat.

Figure 2A:
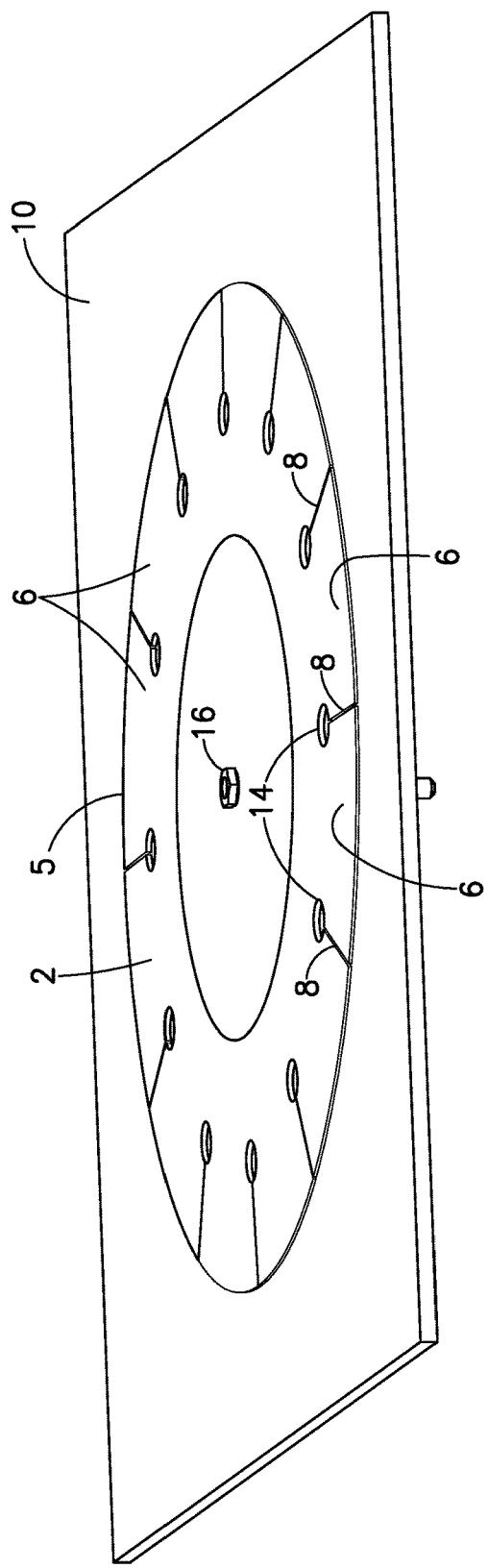
FIGS. 2A and 2B are diagrams respectively showing outer and inner views of the composite patch repair components shown in FIGS. 1A and 1B after the patches and parent structure have been bonded together.
Figure 2B:
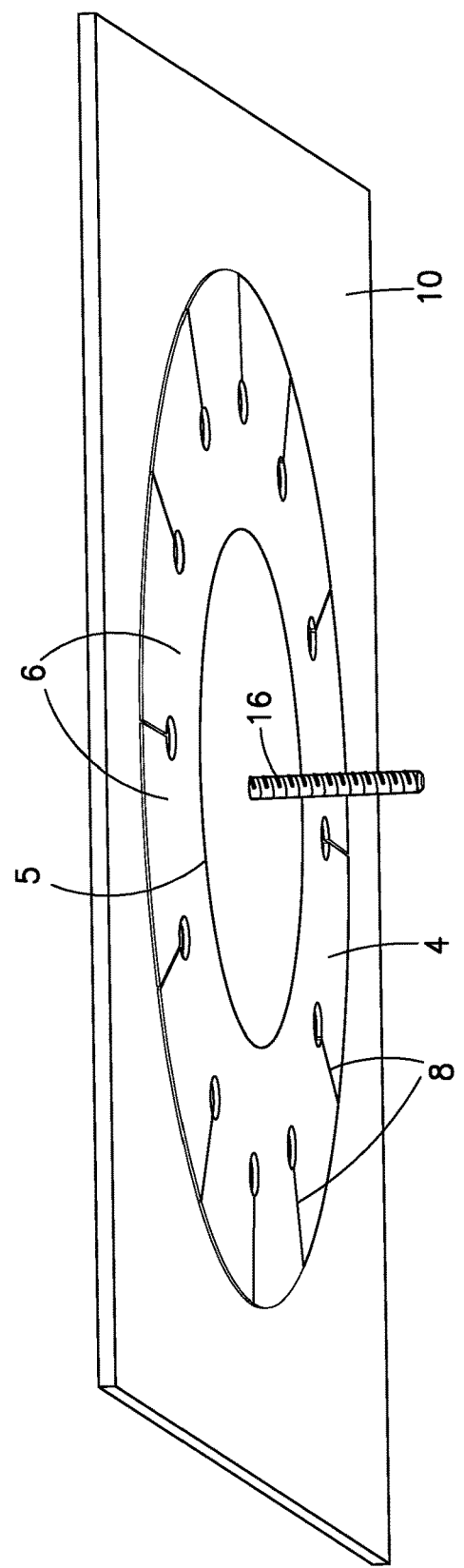

Returning to the repair process, the patches 2 and 4 are pressed together for a duration of time sufficient to allow the adhesive to cure. When the adhesive has fully cured, the patches 2 and 4 will be bonded to the parent structure 10 in a flattened state. FIGS. 2A and 2B show outer and inner views of the composite patch repair components shown in FIGS. 1A and 1B after the patches 2 and 4, insert 12 and parent structure 10 have been bonded together. The threaded rod 16 can now be removed and the bore formed by the center openings of the patch/insert/patch sandwich can be plugged in a manner that leaves no protrusion on any surface of the parent structure 10 which will be exposed to airflow. In some cases, the head of the threaded rod 16 can be cut off.

Still referring to FIGS. 2A and 2B, slits 8 and apertures 14 provide disbond isolation in the bond lines between the flexible members 6 and confronting portions of the parent structure 10 by restricting any disbond from spreading beyond each flexible member 6. Isolating the flexible members 6 from each other restricts disbond growth by preventing any disbond from propagating in a direction transverse to a flexible member 6.

In addition, the adhesive squeezed out at the peripheral edges of the patches and in the gaps between the flexible members help ensure bond line coverage across the patches.

Figure 3:
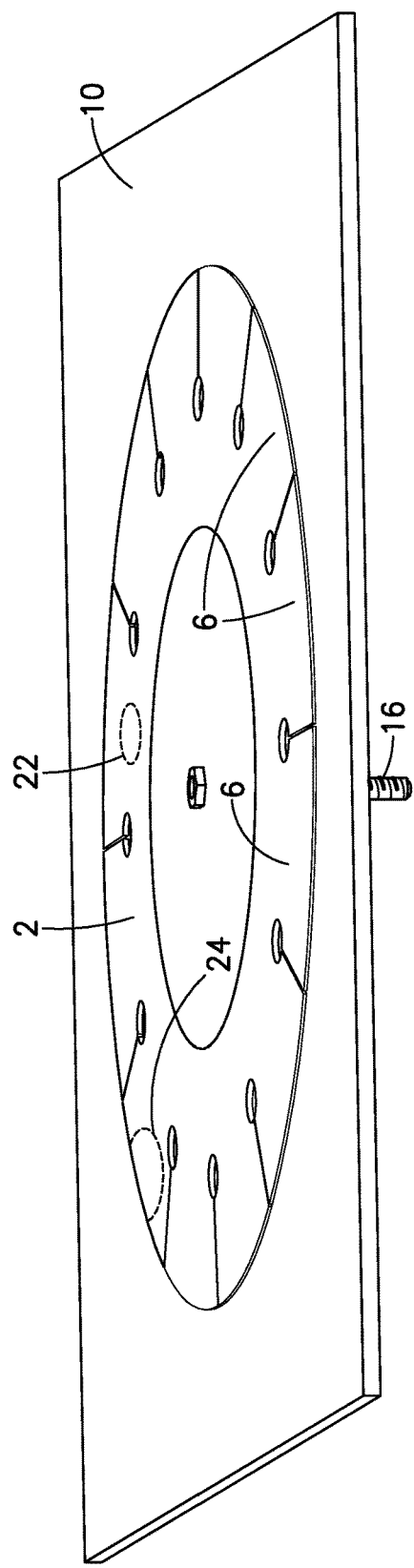
FIG. 3 is a diagram showing a scenario in which disbonds present in a composite patch repair of the type shown in FIG. 2A are detectable due to the pre-stressed fingers of the composite repair patch.

Moreover, because the previously curved flexible members 6 are now bonded in a flattened state to the parent structure 10, the flexible members are pre-stressed at the bond line and will tend to return to a curved state if the bond strength becomes zero (i.e., if the flexible member or a portion thereof releases from the underlying parent structure). If a sufficiently large disbond occurs between a flexible member 6 and the confronting portion of the parent structure 10, then at least a portion of that flexible member will move as it seeks to return to its unflexed state. In many cases, the resulting change in shape of the flexible member in the area of the disbond will be visible, providing a bond failure indication to an inspector. Such movement and deformation can prevent the formation of a kissing bond, which can be missed by current NDE methods. Instead a disbond is formed which can be readily detected using NDE methods due to the absence of contact (i.e., due to the presence of a gap at the interface) between the released portion of the flexible member and the parent structure at the location of the disbond. FIG. 3 shows a scenario in which disbonds 22 and 24 between patch 2 and parent structure 10 are visible and detectable by NDE methods.

Figure 4:
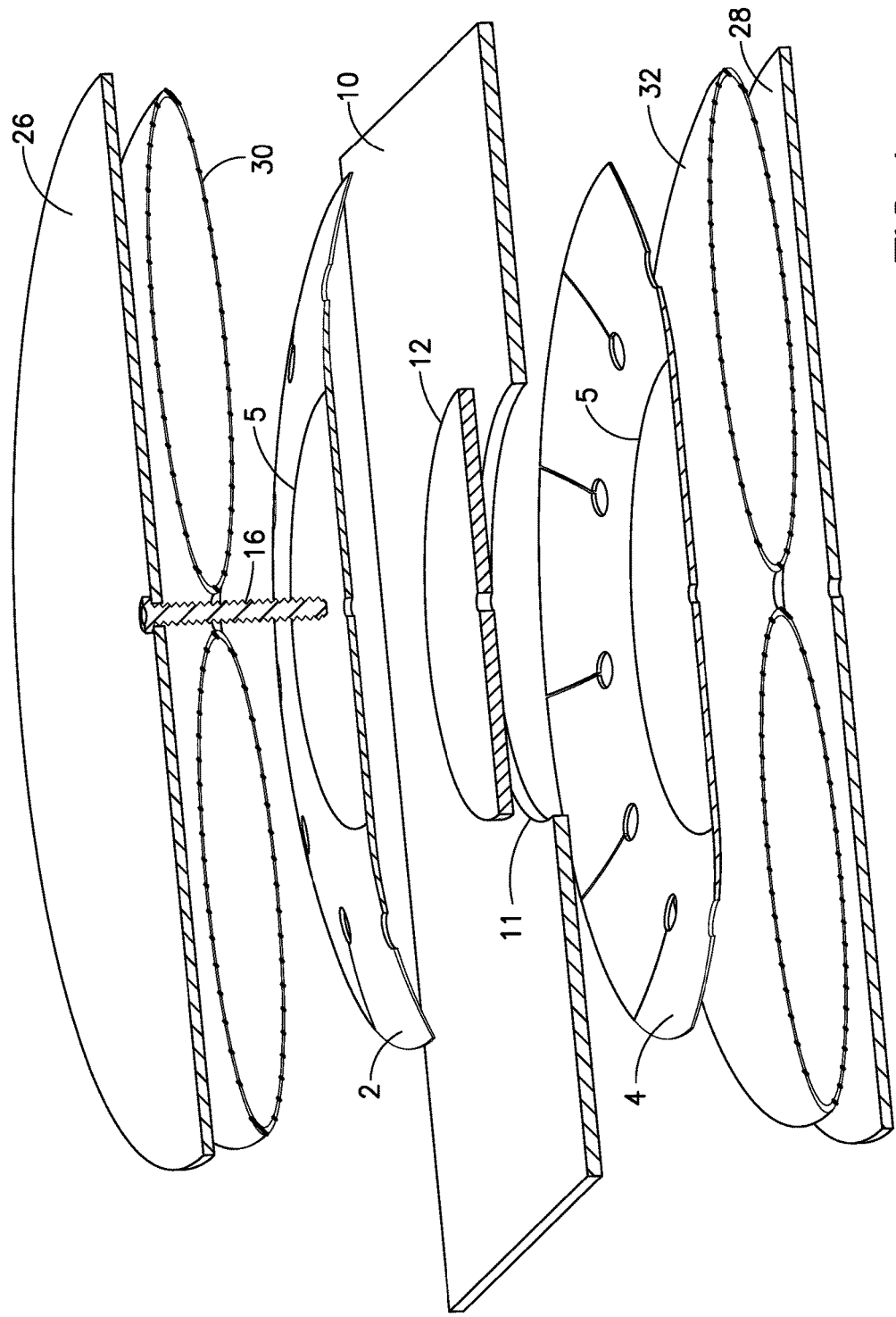
FIG. 4 is a diagram showing an exploded sectional view of an arrangement in which bladders, pressure plates and a center rod are used to apply uniform pressure during bonding of pre-stressed composite patches to opposing sides of a composite parent structure. (Adhesive is not shown in FIG. 4.)

FIG. 4 is an exploded sectional view of unassembled components of a verifiable patch repair arrangement in accordance with an alternative embodiment. Again the object being repaired is a composite parent structure 10 having a hole 11 in which a composite insert 12 will be inserted. Again, a pair of composite patches 2 and 4 will be placed on opposite sides of the parent structure 10 in respective positions above and below the insert 12. The patches 2 and 4 may have the same structure as the patches previously described and shown in FIG. 1A. Again the adhesive which will bond the patches 2 and 4 to the insert 12 and to the parent structure 10 is not shown. The parent structure 10 may be a skin of an aircraft structure, such as a skin of a fuselage. The composite material may comprise fiber-reinforced plastic.

In accordance with an alternative embodiment shown in FIG. 4, means are provided for applying a uniform pressure on the flexible patches. The means for applying uniform pressure comprise a pair of bladders 30 and 32, which will be placed in contact with patches 2 and 4 respectively, and a pair of pressure plates 26 and 28, which will be placed in contact with bladders 30 and 32 respectively. Each of pressure plates 26 and 28, bladders 30 and 32, patches 2 and 4, and insert 12 has a center opening through a threaded rod 16 is passed. Again the nut which couples to the shaft of the threaded rod 16 is not shown, but the mechanism for generating a mechanical force to press the patches 2 and 4 against the parent structure 10 is analogous to what has been previously described with respect to the embodiment shown in FIG. 1A. Tightening of the nut produces a mechanical force which presses the pressure plates 26 and 28 against bladders 30 and 32, which in turn press against the patches 2 and 4 respectively, causing the patches 2 and 4 to contact and conform to the surfaces of the parent structure 10. More specifically, the head of the threaded rod 16 exerts a contact force on the portion of pressure plate 26 that surrounds its center opening 18 while the turning nut exerts an equal and opposite contact force on the portion of pressure plate 28 that surrounds its center opening. As the pressure plates 26 and 28 exert pressure on the bladders 30 and 32, the bladders 30 and 32 distribute those pressures uniformly over the entire surface areas of the patches 2 and 4. The patches 2 and 4 are pressed together for a duration of time sufficient to allow the adhesive to cure. Then the repair set-up can be dismantled by unscrewing the nut from the threaded rod 16, removing the threaded rod 16, and then removing the bladders and pressure plates. The bore formed by the center openings of the patch/insert/patch sandwich can be plugged as previously described.

Figure 5:
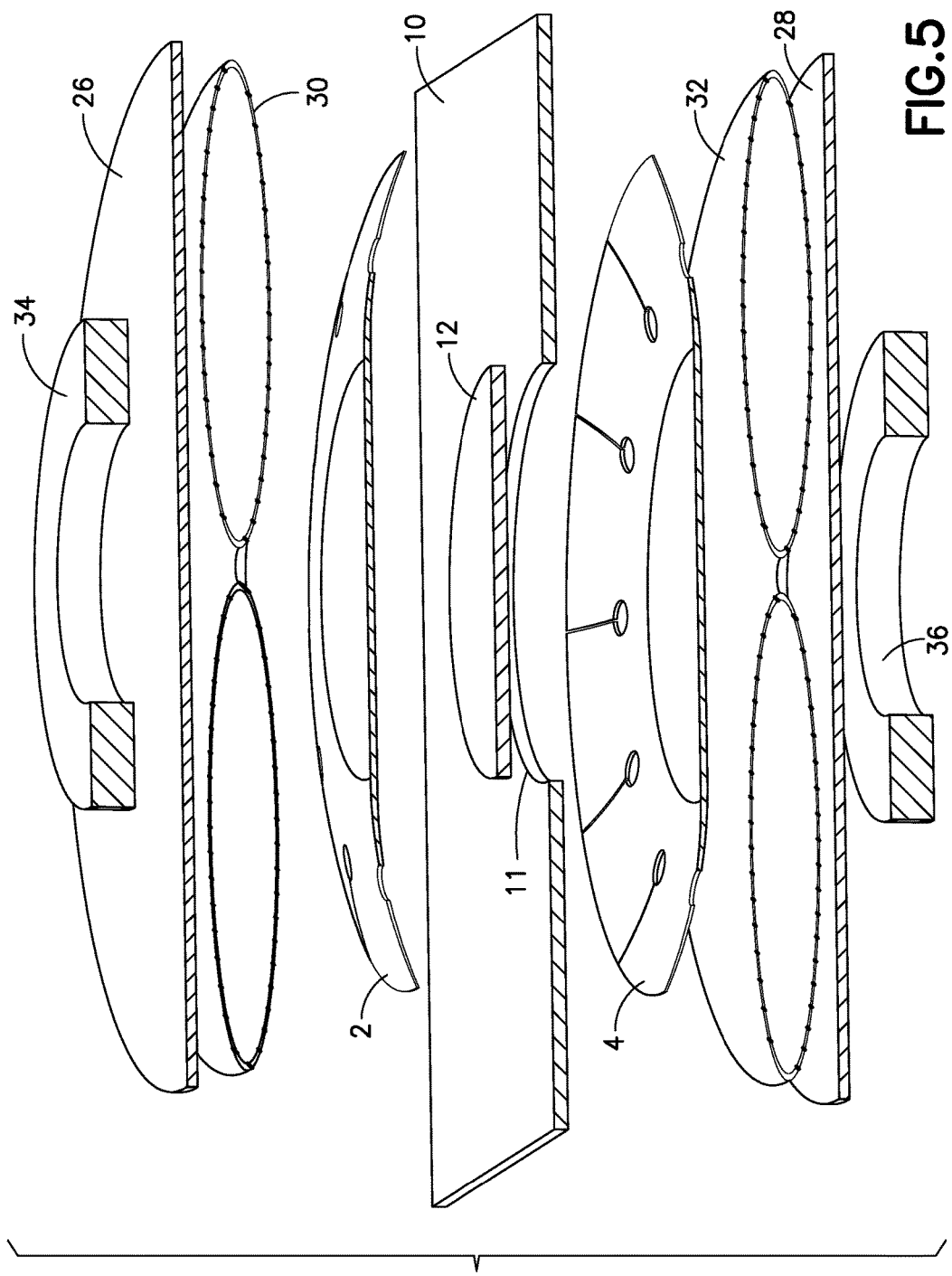
FIG. 5 is a diagram showing an exploded sectional view of an arrangement in which bladders, pressure plates and magnets are used to apply uniform pressure during bonding of pre-stressed composite patches to opposing sides of a composite parent structure. (Adhesive is not shown in FIG. 5.)

In accordance with a further alternative embodiment shown in FIG. 5, coupled magnets 34 and 36 can be used to exert magnetic forces on the pressure plates 26 and 28 instead of using a threaded rod and nut to produce a mechanical force. The magnets 34 and 36 may be high-strength permanent magnets (for example, rare-earth magnets such as those made of neodymium, iron and boron), electro-magnets, or electro-permanent magnets. In this implementation, the pressure plates 26 and 28, patches 2 and 4, and insert 12 do not require center openings, thereby eliminating the need to plug a bore formed by center openings of the patch/insert/patch sandwich. If the parent structure 10 is relatively thin, two magnets may not be needed; instead the opposing pressure plate 28 can be made of a paramagnetic material, such as 400 series stainless steel. Again the pressures exerted by the pressure plates 26 and 28 (due to the attractive forces produced by the magnets) are uniformly distributed over the surface areas of patches 2 and 4 by the bladders 30 and 32 during flattening of the patches 2 and 4 and curing of the adhesive (not shown).

Figure 6:
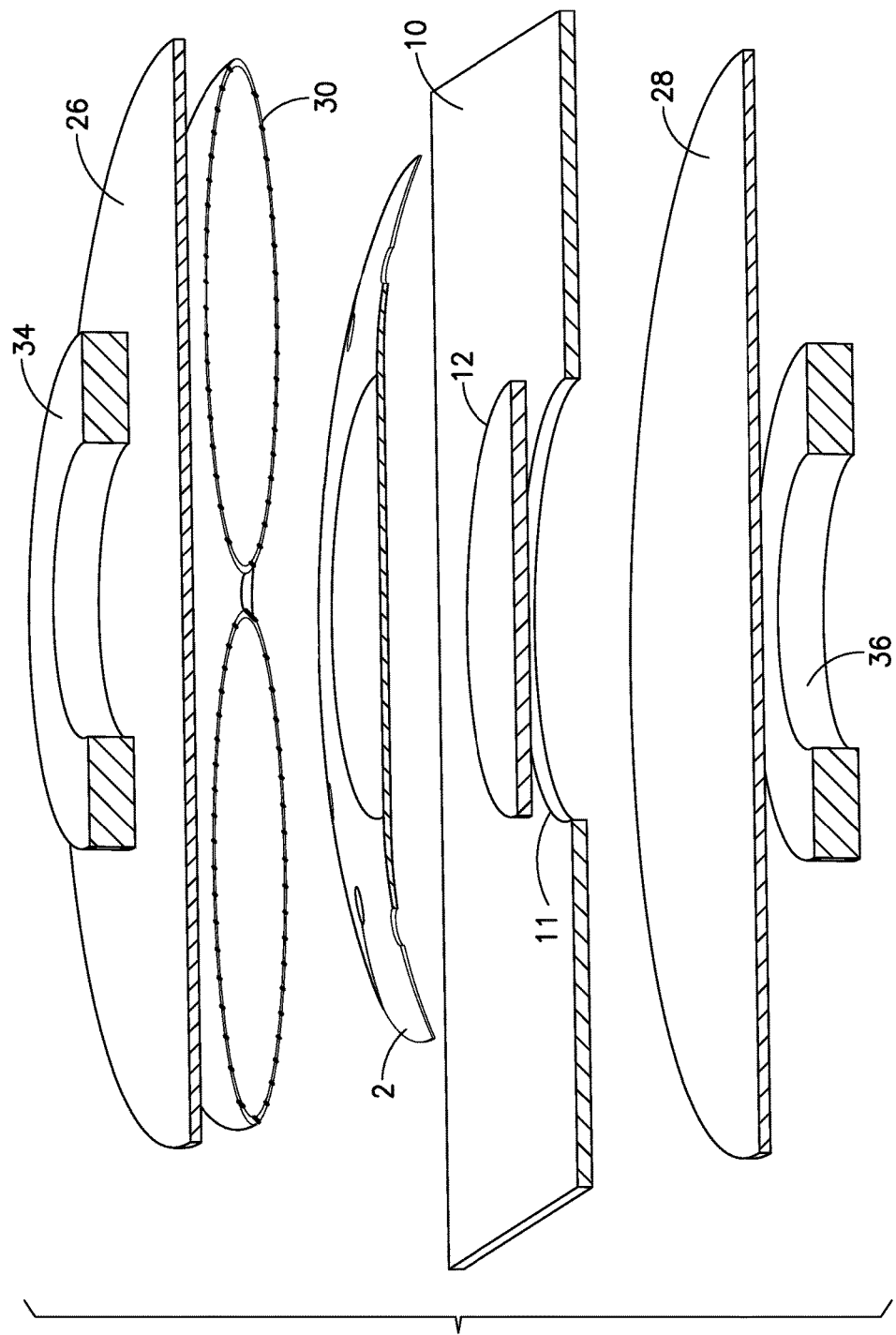
FIG. 6 is a diagram showing an exploded sectional view of an arrangement in which a bladder, two pressure plates and two magnets are used to apply uniform pressure during bonding of a single pre-stressed composite patch to one side of a composite parent structure. (Adhesive is not shown in FIG. 6.)

The embodiments shown in FIGS. 3-5 each involve two repair patches 2 and 4 bonded to opposite sides of a parent structure 10. In many cases, however, a single patch 2 (see FIG. 6) placed on one side of the parent structure 10 will suffice. The embodiment depicted in FIG. 6 comprises a pair of pressure plates 26 and 28 disposed on opposing sides of the parent structure, a single bladder 30 disposed between the single patch 2 and the pressure plate 26, and a pair of magnets 34 and 36 coupled across the repair to exert magnetic forces that will move pressure plate 26 toward the parent structure 10 to flatten patch 2 and clamps pressure plate 28 against the lower surface of parent structure 10. The pressure exerted by pressure plate 26 is uniformly distributed over the surface area of patch 2 by bladder 30. In this embodiment, the pressure plate 28 is in contact with and bears against the lower surface of the parent structure 10. The adhesive between patch 2 and insert 12 and between patch 2 and parent structure 10 is not shown in FIG. 6.

In an alternative embodiment not shown, a single repair patch can be applied using a threaded rod and nut arrangement to press pressure plate 26 toward the parent structure 10 to flatten the patch 2.

Figure 7:
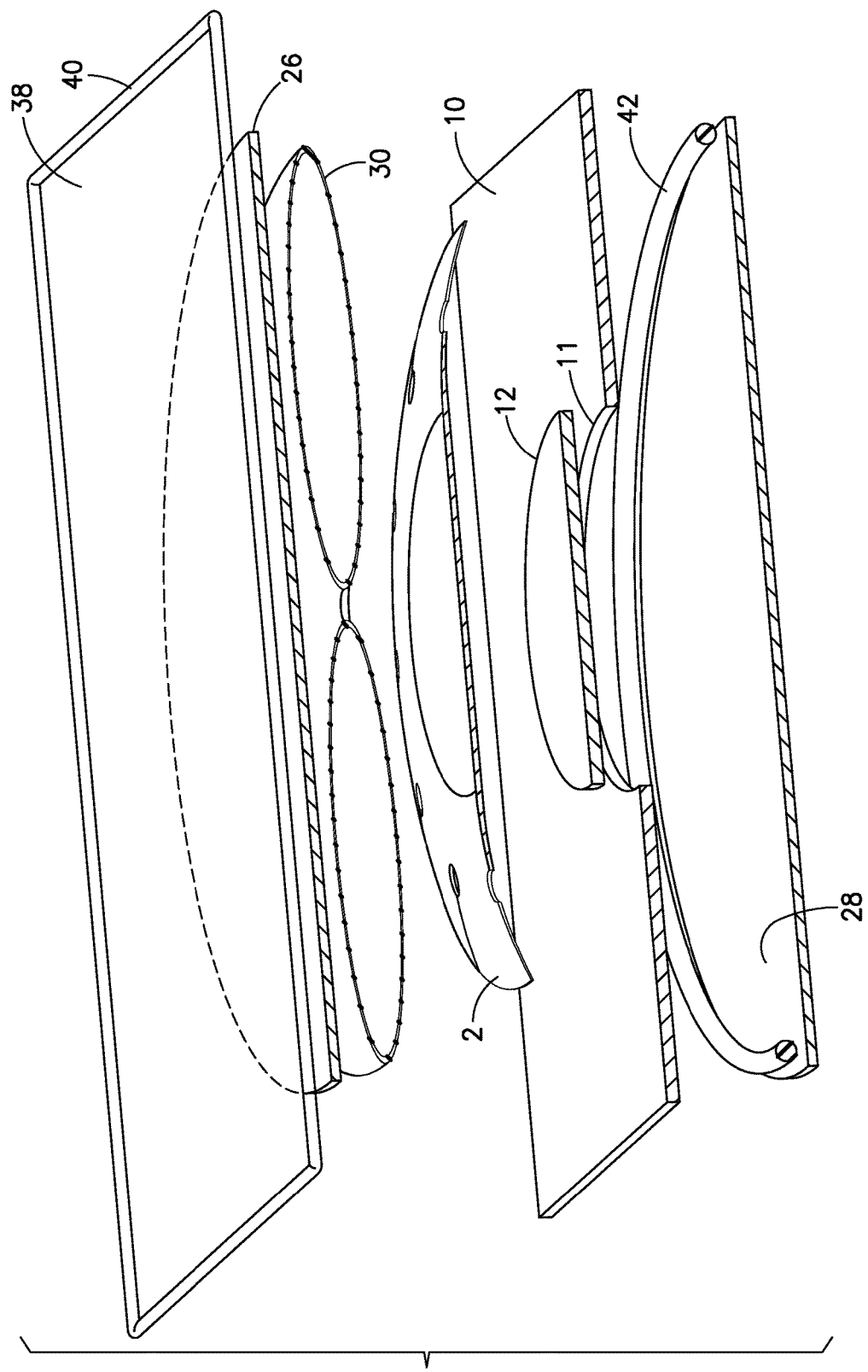
FIG. 7 is a diagram showing an exploded sectional view of an arrangement in which a vacuum bag, a bladder, and two pressure plates are used to apply uniform pressure during bonding of a single pre-stressed composite patch to one side of a composite parent structure. (Adhesive is not shown in FIG. 7.)

In accordance with another alternative embodiment, a single patch can be applied using vacuum bag methods, as shown in FIG. 7. The set-up depicted in FIG. 7 comprises the following components on one side of the parent structure: a single patch 2, an upper pressure plate 26, a bladder 30 disposed between patch 2 and pressure plate 26, and a vacuum bag 38 having a perimeter which will be hermetically sealed to the upper surface of the parent structure 10 by means of a seal 40. On the other side of the parent structure 10, the set-up includes a pressure plate 28 having a perimeter which will be hermetically sealed to the lower surface of the parent structure 10 by means of a seal 42. When the pressure plate 28 and the vacuum bag 38 are sealed to the parent structure 10, they form a vacuum chamber. This vacuum chamber can be coupled to a vacuum source (not shown) by means of a vacuum probe (not shown) that passes through an opening in the vacuum bag 38 and is connected to the vacuum source by a hose (not shown). Evacuation of the vacuum chamber causes the vacuum bag 38 to pull the pressure plate 26 toward the parent structure 10, thereby producing a pressure that is uniformly distributed over the surface area of patch 2 by the bladder 30. Evacuation of the vacuum chamber also clamps pressure plate 28 against the lower surface of parent structure 10. The adhesive between patch 2 and insert 12 and between patch 2 and parent structure 10 is not shown in FIG. 7.

The center rod, magnet, and vacuum bag methods disclosed above are all innovative ways to simplify the repair process, thereby making it more robust and reducing re-repairs.

A single composite repair patch of the type disclosed above could also be used in cases where the site of damage is a depression, not a through-hole. In such cases, an insert would be provided that fits in the depression. In the case where the pressure applicator comprises a threaded rod and a nut, the insert and the patch would both have a center opening for passage of the threaded rod. Alternatively, if the pressure applicator comprises magnets, such center openings would not be needed.

While apparatus and methods for patching a hole in composite structure have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The method claims set forth hereinafter should not be construed to require that the steps recited therein be performed in alphabetical order (any alphabetical ordering in the claims is used solely for the purpose of referencing previously recited steps) or in the order in which they are recited. Nor should they be construed to exclude any portions of two or more steps being performed concurrently or alternatingly.

The invention claimed is:

1. A method for patching a hole in a composite parent structure, said method comprising:
    inserting an insert in the hole;
    while the insert is in the hole, placing a composite patch having a multiplicity of curved flexible members on one side of the composite parent structure in a position where a central portion of the composite patch overlies the insert and the flexible members contact opposing portions of the composite parent structure disposed around the insert;

providing adhesive between the composite patch and the insert, and between the composite patch and the composite parent structure; and pressing the composite patch against the composite parent structure with sufficient pressure to force the flexible members to conform to the shape of the surface of the opposing portions of the composite parent structure while the adhesive therebetween is curing.

2. The method as recited in claim 1, further comprising supporting the insert on one side while the composite patch is pressing on another side of the insert.

3. The method as recited in claim 1, wherein the flexible members of the composite patch become less curved or straight during said pressing step.

4. The method as recited in claim 1, further comprising non-destructive evaluation of the integrity of bond lines between the flexible members of the composite patch and the opposing portions of the composite parent structure.

5. The method as recited in claim 1, wherein said pressing step comprises applying pressure using mechanical force.

6. The method as recited in claim 1, wherein said pressing step comprises applying pressure using magnetic force.

7. The method as recited in claim 1, wherein said pressing step comprises applying vacuum pressure.

8. The method as recited in claim 1, further comprising placing a bladder over said composite patch, wherein said pressing step comprises applying pressure to said bladder.

9. The method as recited in claim 1, wherein the composite parent structure and the composite patch are made of fiber-reinforced composite material.

10. A method for patching a hole in a composite parent structure, said method comprising:
inserting an insert in the hole;
while the insert is in the hole, placing a composite patch having a multiplicity of curved flexible members on one side of the composite parent structure in a position where a central portion of the composite patch overlies the insert and the flexible members contact opposing portions of the composite parent structure disposed around the insert;
providing adhesive between the composite patch and the insert, and between the composite patch and the composite parent structure;
pressing the composite patch against the composite parent structure with sufficient pressure to force the flexible members to conform to the shape of the surface of the opposing portions of the composite parent structure so that spaces between the flexible members and the composite parent structure are filled with adhesive; and
curing the adhesive while the flexible members are conformed to the shape of the surface of the opposing portions of the composite parent structure in a manner that causes the flexible members to bond to the parent structure.

11. The method as recited in claim 10, wherein after the flexible members have been bonded to the parent structure by said curing, each flexible member is in a respective pre-stressed flexed state with a potential to deform toward an unflexed state in the event that a strength of the bond between that flexible member and an opposing portion of said parent structure becomes zero.

12. The method as recited in claim 10, further comprising supporting the insert on one side while the composite patch is being pressed against another side of the insert.

13. The method as recited in claim 10, wherein the flexible members of the composite patch become less curved or straight during said pressing step.

14. The method as recited in claim 10, wherein said pressing step comprises applying pressure using mechanical force.

15. The method as recited in claim 10, wherein said pressing step comprises applying pressure using magnetic force.

16. The method as recited in claim 10, wherein said pressing step comprises applying vacuum pressure.

17. The method as recited in claim 10, further comprising placing a bladder over said composite patch, wherein said pressing step comprises applying pressure to said bladder.

18. The method as recited in claim 10, further comprising placing randomized fibers within the adhesive before the adhesive is cured.

19. The method as recited in claim 10, wherein the composite parent structure and the composite patch are made of fiber-reinforced composite material.

20. A method for patching a hole in a composite parent structure, said method comprising:
inserting an insert in the hole;
while the insert is in the hole, placing a first composite patch having a multiplicity of curved flexible members on one side of the composite parent structure in a position where a central portion of the first composite patch overlies the insert and the flexible members contact opposing portions of the composite parent structure disposed around the insert;
while the insert is in the hole, placing a second composite patch having a multiplicity of curved flexible members on another side of the composite parent structure in a position where a central portion of the second composite patch underlies the insert and the flexible members of the second patch contact opposing portions of the composite parent structure disposed around the insert;
providing adhesive between the first composite patch and the insert, and between the first composite patch and the composite parent structure, between the second composite patch and the insert, and between the second composite patch and the composite parent structure; and
pressing the first and second composite patches toward each other with sufficient pressure to force the flexible members of both patches to conform to the shapes of confronting surfaces of the composite parent structure while the adhesive therebetween is curing.

21. The method as recited in claim 20, further comprising curing the adhesive while the flexible members of the first and second composite patches are conformed to the shapes of the surfaces of the opposing portions of the composite parent structure in a manner that causes the flexible members of the first and second composite patches to bond to the composite parent structure.

22. The method as recited in claim 21, wherein after the flexible members of the first and second composite patches have been bonded to the parent structure by said curing, each flexible member is in a respective pre-stressed flexed state with a potential to deform toward an unflexed state in the event that a strength of the bond between that flexible member and an opposing portion of said parent structure becomes zero.

23. The method as recited in claim 20, wherein the composite parent structure and the first and second composite patches are made of fiber-reinforced composite material.

* * * * *